United States Patent [19]

Farrell et al.

[11] Patent Number: 4,536,409

[45] Date of Patent: Aug. 20, 1985

[54] OXYGEN SCAVENGER

[75] Inventors: Christopher J. Farrell, Arlington Heights; Boh C. Tsai, Rolling Meadows, both of Ill.

[73] Assignee: American Can Company, Greenwich, Conn.

[21] Appl. No.: 228,089

[22] Filed: Jan. 23, 1981

[51] Int. Cl.³ .................. A23B 00/00; B32B 27/08
[52] U.S. Cl. ............................ 426/398; 426/118; 426/124; 426/407; 426/412; 428/35; 428/516; 428/515
[58] Field of Search ............ 428/35, 500, 516, 515, 428/520; 426/412, 127, 407, 398, 118, 124

[56] References Cited

U.S. PATENT DOCUMENTS

| 3,255,020 | 7/1966 | Ferrell | 426/124 |
| 3,419,400 | 12/1968 | Hayhurst | 426/398 |
| 3,429,717 | 2/1969 | Cook et al. | 428/522 |
| 3,670,874 | 6/1972 | Brunner | 426/124 |
| 3,908,070 | 9/1975 | Marzolf | 426/398 |
| 4,041,209 | 8/1977 | Scholle | 428/500 |
| 4,113,652 | 9/1978 | Yoshikawa et al. | 426/398 |
| 4,192,773 | 3/1980 | Yoshikawa et al. | 426/398 |
| 4,254,169 | 3/1981 | Schroeder | 428/516 |
| 4,281,045 | 7/1981 | Sumi et al. | 428/515 |

*Primary Examiner*—Edith Buffalow
*Attorney, Agent, or Firm*—Paul R. Audet; Douglas W. Wyatt

[57] ABSTRACT

This disclosure includes an activatable oxygen scavenger used as a part of a packaging structure for comestibles.

125 Claims, No Drawings 4,536,409

1

OXYGEN SCAVENGER

BACKGROUND OF THE INVENTION

This disclosure relates to containers produced from polymeric materials and designed for packing comestibles and the like. More particularly, this invention relates to containers which are used to pack foods which have been retort processed for purposes of sterility. A container of this type and a method for its manufacture are disclosed in U.S. Ser. No. 059,374-MULTILAYER CONTAINER AND METHOD OF MAKING SAME and apparatus therefore is disclosed in U.S. Ser. No. 059,375-APPARATUS FOR MAKING A MULTILAYER INJECTION BLOW MOLDED CONTAINER; those applications are assigned to the same assignee as the present application.

In the past, multilayer blow molded polymeric containers have been suggested including those with barrier layers to reduce the permeation of oxygen through the wall of the container. The food or beverage packed therewithin is thus protected against oxidation. The problem of oxygen permeation is well known and it is known that permeation can be reduced by a suitable barrier material. Moreover, such materials have been used or suggested in a multilayer construction and have been used in connection with oxygen scavenging systems in order to absorb any oxygen which might pass through the barrier or remain in the head space above the packed and processed food or beverage. More particularly, Valyi U.S. Pat. No. 4,048,361 discloses a food container formed with a barrier material inside of which is a carrier layer containing a "getter". The getter may be an absorbent for any gas which permeates the barrier layer. An alternate approach of Valyi includes a barrier layer on both sides of the carrier layer whereby oxygen leaving the food or coming from the outside will be slowly absorbed by the getter. The Valyi patent specifically discloses antioxidants and container shape and construction, but is more general as regards other getters.

An early patent to Vijlbrief, U.S. Pat. NO. 4,586,514 discloses the use of antioxidizing agents mixed within a plastic barrier layer of a container to reduce the permeation of oxygen to the oxidizable material such as beer within such a container.

The U.S. Pat. No. 3,429,717 to Cook discloses a barrier of Saran ® flexible film sandwich such as is used to wrap food with an antioxidant uniformly distributed in a solvent between the layers of Saran ®. The antioxidant selected for use by Cook depends upon the film as well as the product to be contained in the light and heat condition to which the package will be exposed.

Yoshikawa teaches in U.S. Pat. No. 4,113,652 that the amount of ammonium salts or water in an oxygen scavenger comprising an alkaline metal sulfite, a ferrous compound and water can be adjusted to lengthen the period before the oxygen scavenger becomes effective. That is to say that, the addition of more water or ammonium salts to the oxygen scavenger will extend the period of latency. Yoskikawa only teaches a period of latency up to fifty hours. As will be appreciated when the thrust of the present disclosure is fully understood, such a latent period is impractical from the standpoint of commerical reality for a food container.

Various oxygen scavengers are also known in the art. An early teaching is the Loo et al patent U.S. Pat. No. 2,825,651 which discloses a dry oxygen remover system which includes hydrates, for example, an anhydrous sodium sulfite catalyzed by copper sulfate pentahydrate. Such an oxygen remover is included as a pellet inside of a protective package and is placed in the container head space. The problem of practicing the Loo et al patent are pointed out in the Yoshikawa patent.

More germane to multilayer containers is Scholle U.S. Pat. No. 4,041,209 which discloses an aqueous solution of a reducing sulfite salt which can be directly oxidized disposed between a high barrier outer layer and a low barrier inner layer thus permitting the oxygent to permeate outward from the head space to react with the sulfite salt while retarding oxygen flow from outside inward. However, an oxygen scavenger system must remain passive or inert in order to preserve its oxygen scavenging capacity until such time as the food is sealed within the container. Many times a container may sit empty in a warehouse for several months before it is used. None of the prior art containers and oxygen scavenging systems disclose a means by which the passivity of the scavenger contained in a multilayer container will be maintained until such time as the oxygen scavenger is most beneficial.

OBJECTS OF THE INVENTION

It is, therefore, an object of this invention to provide a technique whereby an oxygen scavenger can be included in a multilayer construction in which the scavenger remains passive until such time as it is needed.

It is a further object of this invention to provide an oxygen scavenger which can be successfully activated by a simple and convenient method at the precise moment when its greatest need begins.

It is a further object of this invention to present a simple low cost reliable container construction which includes an oxygen scavenger in combination with polymeric materials which are positioned and selected for maximum usefulness and minimum usage in a multilayer combination.

A multilayer wall construction for a polymeric container to be used to pack comestibles can be constructed with a plurality of layers each of which is selected to perform particular functions. The outer and inner layers are usually structual and protective layers selected to exclude the outside elements and contain the packed comestibles respectively. Between outer and inner layers are materials designed to control the unwanted permeation of oxygen. For example, the outermost layer which is designed to impart structural integrity to the construction, can be an olefinic thermoplastic material for low cost, easy formability and physical characteristics. Similarly, the innermost layer is also structural and can likewise be fashioned from materials that are compatible with comestibles and are low in cost and easily formed.

Between the two structural layers, it is useful to interpose an oxygen barrier thermoplastic layer which may include ethylene vinyl alcohol co-polymers, such as EVAL ® produced by Kuraray of Osaka, Japan, Saran ® and the like materials having low permeability with respect to the transmission of oxygen. It is advantageous to sandwich the barrier layer between a pair of outer and inner protective layers to provide a combination of packaging properties. Between the sandwiching layers and the barrier an adhesive material can be included to assure the integrity between the outer and inner layers and the inbetween oxygen barrier layer.

To ensure low oxygen transmission by a moisture sensitive barrier layer, drying agents can be used as disclosed in pending application U.S. Ser. No. 101,703 filed Dec. 10, 1979 which is assigned to the same Company as the present assignee. That particular disclosure relates to the desired need to absorb moisture which may permeate through to the oxygen barrier under certain conditions during the warehousing, packing and sterilization processes and the subsequent storage of the container filled with comestibles. Under certain circumstances of high humidity the same oxygen barrier may lose its high resistance to oxygen permeation and the benefits of an oxygen barrier would thereby otherwise be reduced.

It is recognized that comestibles packed in containers by conventional methods with a hermetic double seamed end will include a certain amount of head space gases and entrained oxygen. Oxygen in the head space gases will react with some comestibles. Although it is desirable to keep the head space gases to a minimum to provide reliable end closure with hermetic seals it is also important to minimize the amount of oxygen which can react with the contents in the container. Oxygen permeation into plastic containers is an additional concern not present with metal cans. Thus, an oxygen absorbing system to protect the comestibles may be required, especially for a plastic container.

Minimizing oxidation of the comestibles will help to prevent product degradation. Changes in color, nutritive value and flavor may be associated directly with degradation due to oxygen combining with the comestibles. In a multilayer plastic container a system to absorb oxygen is of extreme importance because even excellent oxygen barriers reduce, but do not wholly exclude the permeation of the oxygen. A system which will absorb oxygen that permeates the barrier, and which is located between the barrier and the comestible is desirable. More particularly, an oxygen absorption system with a greater affinity for oxygen than the comestibles is desirable. Ideally, such a system should be capable of absorbing oxygen faster than the comestibles as well as having a stronger affinity for oxygen than the comestibles.

It is also essential that the oxygen absorption system is not activated before the comestibles are packed. The container should be capable of manufacture and subsequent warehouse storage with the oxygen absorbing system in a passive state until the precise time at which the oxygen absorption is required, at which time such a system may be activated. Without a triggerable absorption system having passive and active states, severe depletion of usefulness could occur during empty storage prior to packing. The benefit of any absorption system without triggering is limited to prompt use of the container after manufacture. Such a limitation is impractical in connection with standard commercial practices for hermetically packaging of comestibles.

An oxygen absorption system with a controllable chemical behavior is desirable and may include a palladium catalyst to combine hydrogen and oxygen in the container to form water. U.S. Pat. No. 4,125,632 discloses that type of system which is triggered by flushing of the container with a gas mixture including hydrogen. That process is expensive due to the palladium and the extra process step.

The present invention provides an oxygen absorption system which can be employed with commonly used filling and process equipment and the normal retort operation with polymer container, and is triggered by the sterilization procedures used during packing and processing. More particularly, the triggering mechanism here includes a system which is activated by the ingress of water through the walls of the multilayer polymeric container. This ingress may occur during packaging, processing or sterilization of the container. The increased temperature utilized in these operations speeds up the permeation of water into the oxygen absorber to activate it. More specifically, the oxygen absorber when dry is passive, but upon contact with moisture resulting from normal processing it is activated and begins to react with oxygen.

In the past antioxidants have been added to polymeric resins to be formed into containers and to the materials contained within to inhibit their oxidation. It is also known that certain antioxidants also have an ability to react with oxygen but usually to a very limited extent. The differences between direct oxygen absorption and the action of typical antioxidants is relevant to the present invention which seeks to use a dry direct oxygen absorber in contrast to the earlier work which used antioxidants such as propyl gallate, butylated hydroxyanisole, di-tertiary-butylparacresol (see Valyi U.S. Pat. No. 4,048,361). It is important to appreciate that the typical antioxidant operates in a manner different from direct oxygen absorbers. More specifically, antioxidants are usually used in small percentages to terminate the degradation process of the material into which it is mixed i.e., the plastic package itself or the contents. A direct oxygen absorber as used in this invention is capable of reacting with a much larger amount of oxygen than antioxidants would and is also employed at relatively large concentrations. The chemical distinction is that oxygen absorbers, or direct antioxidants react chemically only with oxygen. While indirect antioxidants may react with small amounts of molecular oxygen their primary action is to interfere with the reactions involved in oxidative degradation.

The concept of triggering is appreciated only in part by the Musher U.S. Pat. No. 2,316,804 where materials which do not have antioxidant activity when initially applied can, in the presence of elevated temperatures and organic packaging compositions, develop marked oxygen scavenging effects. These materials are inappropriate for containers formed by melt extrusion, since the high temperatures of manufacture would activate the oxygen absorption prematurely.

SUMMARY OF THE INVENTION

As disclosed, the preferred embodiment consists of five layers of thermoplastic material, the outer and inner being polyolefinic or olefinic and the buried layer being an oxygen barrier layer. Between the barrier and olefin layers are adhesive layers to assure structure integrity. Either or both adhesive layers may include a direct antioxidant. Locating the oxygen absorbing system containing a direct antioxidant between the oxygen barrier and the comestible is preferred. A number of such systems could be used in the adhesive. The selection of the antioxidant is dependent upon the particular process conditions for the container and the amount of oxygen absorption desired.

The multilayer container has olefinic outer and inner layers which are resistant to the transmission of water vapor at room temperature, but at elevated temperature, during retorting they permit water vapor to permeate into the oxygen absorbing system. It is the water vapor which is the triggering agent.

Recent publications disclose systems for use in a package to be included within the container for reacting in the presence of the moisture in the food, see, for example, German Offenlegungsschrift 28 27 247 published Jan. 4, 1979. These disclosures recognize the potential for oxygen absorption use by a sulfite salt that is wet. However, the water is introduced by either using the hydrated form of the salt or by coming in contact with the water carried in the food. There is no specific teaching of triggering by the controlled application of the water to activate the oxygen absorber, or any appreciation of the discovery that the water vapor permeability of a container wall protecting the sulfite salt can become 1,000 times greater by raising its temperature from 70° to 250° F., as is the situation when polyethylene and polypropylene are used as the inner and outer layers, nor do they teach that other temperature ranges or process conditions will achieve triggering with other structural layer resins.

The structures of the present invention contain compositions which become oxygenphilic and react with oxygen when they have dissolved by absorbing permeated water vapor. Some water-soluble salts can become highly oxygenphilic in this deliquescent state. A deliquescent state as used herein refers to chemicals which are either in the process of dissolving or have dissolved, by absorption of moisture vapor. While almost all inorganic salts will deliquesce when the humidity approaches 100%, this invention is best practiced with chemicals (called deliquescent salts) which deliquesce at lower humidities, i.e. below about 85%.

A deliquescent composition consists of at least one deliquescent salt and one material which absorbs oxygen when wetted. The two functions may be combined in the same salt, such as in the case of potassium sulfite or be separate, as in an interacting mixture of potassium acetate and sodium sulfite. A dry composition in the container wall is triggered when water vapor permeates through during the retort. Afterwards the moisture is trapped by the walls as they cool because their ability to transmit moisture reduces again by a thousand fold. The triggering is, therefore, accomplished by this combination.

Potassium sulfite is an excellent material to use as an oxygen absorber because it is a deliquescent salt and is only oxygenphilic in the wet state. As such it is excellent in achieving the purpose of this invention. Potassium sulfite may be used alone or with other deliquescent salts; especially those which deliquesce at lower relative humidities to influence the triggering time. The status of potassium sulfite for use in connection with food containers is also excellent from the FDA standpoint as potassium sulfite is an approved food additive.

DETAILED DESCRIPTION OF THE INVENTION

The invention can be practiced by manufacturing multilayer polymeric containers as set forth by injection or extrusion molding techniques or by thermoforming. Such plastic multilayer containers can then be sold to food and beverage packers without concern that the oxygen absorption system will be depleted during the time between manufacture and use. More specifically, the preferred system has the olefinic layer protecting the oxygen absorber from moisture so that it will not become highly oxygenphilic until it is retort processed. Packing a wet comestible in a container of the preferred construction and design will result in a gradual triggering of the oxygen absorption system. Potassium sulfite is particularly well suited for use as an oxygen scavenger because it can be readily triggered by the retort process and has enough thermal stability to permit its use in thermoplastic processes such as injection molding.

To test the triggering mechanism for oxygen absorption a number of square plaques having five layers were assembled. The outer layers were cut from a 15 mil thick polyolefin sheet which was a 50:50 melt blend of polyethylene and polypropylene. The central layer was a 2 mil sheet of ethylene vinyl alcohol co-polymer (GLD; as sold by Nippon Goshei Co., Ltd., Japan). The interleaving adhesive layers were a modified polyolefin (Plexar; as sold by Chemplex Inc., Rolling Meadows, Ill.) into which was melt compounded finely divided potassium sulfite at a loading of 20% by weight. These adhesive sheets were about 2 mil thick. The separate layers were stacked and then melt-pressed together to form an integral plaque in which the outer olefin sheets come together only at the edges to completely protect the innermost layers from ambient moisture. A further set of plaques were made in which di-sodium phosphate was substituted for potassium sulfite in the adhesive layer. Because di-sodium phosphate does not absorb oxygen these were used as a control.

These plaques were autoclaved at 250° F. for different periods of time and were then analyzed on a MoCon oxygen permeability tester. In this instrument both sides of the plaques can be purged with nitrogen gas. The gas stream from the lower side is passed over an oxygen detector. Under perfect conditions the reading from this detector should be zero; in practice leaks cause a small reading, known as the baseline. Plaques which contain an active oxygen scavenger depress the baseline because some of the oxygen which is normally leaked is absorbed i.e. reacts with the direct antioxidant. This technique can be used to identify those plaques which are absorbing oxygen. Table 1 compares values obtained under nitrogen gas purge for unretorted and retorted plaques.

TABLE 1

| AGENT IN ADHESIVE LAYER | $K_2SO_3$ | | | | | | | | $Na_2HPO_4$ | |
|---|---|---|---|---|---|---|---|---|---|---|
| Autoclaving time (mins) | 0 | 0 | 30 | 30 | 45 | 45 | 60 | 60 | 120 | 120 |
| Baseline reading (mV) | .03 | .03 | .02 | .03 | .02 | .02 | .02 | .02 | .03 | .03 |

The results indicate that 30 minutes autoclaving is the borderline requirement to start the oxygen absorption with this composition while autoclaving for 45 minutes triggers it.

For further testing, cylindrical-sided containers were thermoformed from multilayer co-extruded sheet. These containers had a diameter of 4 1/16" and a depth of 4 7/16". The body of the container consisted of six layers. The direct antioxidant or oxygen scavenger $K_2SO_3$ was mixed in a carrier material high density polyethylene (HDPE) which was placed next to the inner polyolefin (50:50 melt blend of high density polyethylene [HDPE] and polypropylene [PP]) structural layer. Specifically, the layer composition of the container from the inner surface to the outer surface was as follows: 12 mil HDPE-PP/4 mil HDPE with 30% (by weight) $K_2SO_3$/1 mil Plexar/2 mil EVAL/1 mil Plexar/12 mil HDPE-PP blend. EVAL is an ethylene vinyl alcohol co-polymer made by Kuraray Chemical Co., Ltd., Japan. A group of five layer containers without $K_2SO_3$ were also included as the control. The layer composition was: 15 mil HDPE-PP/1 mil Plexar/2 mil EVAL/1 mil Plexar/15 mil HDPE-PP. The cans were filled with hot (160° F.) water and double seamed with metal lids containing two small rubber grommets. The head space between water in the can and the lid was approximately 6/32 inch high.

At given storage times after retoring (at 250° F.) or hot filling (at 160° F.) a sample of head space gas was extracted through a grommet and analyzed for oxgen and nitrogen using gas chromatography. The oxygen concentrations in the head space (measured as a ratio of oxygen to oxygen plus nitrogen) are shown in Table 2. The concentration in the hot-filled but unautoclaved container is less than that of air (0.21) because, as the hot water cools, its increased affinity for oxygen lowers the $O_2$ concentration in the head space.

Thus, it is clear that the autoclaved containers are triggered to absorb oxygen since their oxygen level decreases while that of the unautoclaved container is steady with time. This further demonstrates the efficacy of the system for triggered oxygen absorption.

TABLE 2*

| PROCESS | OXYGEN ABSORBING AGENT | STORAGE TIME, DAYS | | | | | | | | | | |
|---|---|---|---|---|---|---|---|---|---|---|---|---|
| | | .02 | .04 | .75 | 1 | 3 | 5 | 6 | 10 | 14 | 18 | 20 | 28 |
| Hot fill | None | | | .19 | | | | .18 | | .18 | | | .18 |
| Hot fill | $K_2SO_3$ | | | .2 | | | | .19 | | .19 | | | .18 |
| Autoclave, 30 Min | $K_2SO_3$ | | .18 | | .15 | | | .13 | | .08 | | .06 | .05 |
| Autoclave, 2 hr | $K_2SO_3$ | .165 | | | | .11 | .08 | | .045 | | .022 | | |

*The numbers in the Table are oxygen concentrations in the head spaces.

TABLE 2A

| | $O_2$ CONTENT - $cm^3$ | |
|---|---|---|
| | Initial | 3 months |
| No additives | 10 | 34 |
| $K_2SO_3$ | 11 | 8 |

Table 2A shows data accumulated over a three-month period The containers were filled with hot water and retorted at 250° F. for two hours. They were then stored for eighteeen days. After this they were emptied and filled with 10 cc of water to maintain 100% relative humidity inside the container and sealed. The head space above the water was filled with about 99% nitrogen and 1% oxygen. These filled and sealed containers were stored in an environment with 100% oxygen at atmospheric pressure and 75% RH for 3 months. Containers with and without the potassium sulfite had the same processing and storage conditions. From Table 2A it is apparent that the scavenger containe not only prevented permeation but also absorbed 3 cc of oxygen from the head space. The container without scavenger permitted the permeation of 24 cc of oxygen into the container. Though the additive $K_2SO_3$ can also serve as a drying agent to protect the moisture sensitive barrier layer EVAL, the decrease of oxygen concentration in the head space over the three month period conclusively demonstrates the scavenging effect of $K_2SO_3$.

While the containers described above have six layers, they could have less layers. For example, a five layer construction wherein the potassium sulfite has been mixed into the adhesive is useful.

This system shows a prolonged passive state which, by its deliquescent nature, changes into its active oxygenphilic state. Other systems which have a less prolonged passive state can also be exploited if processing can be made to trigger a large change in the activity of the oxygenphilic state.

Such a system which after triggering by water is an effective oxygen scavenger is a mixture of a heat treated gelatin and a strong alkali. Ordinarily, gelatin will not scavenge oxygen, but it will do so after a heat treatment, either alone or in the presence of the alkali (over 300° F.) for more than 5 mins.

The following examples illustrate the effectiveness of this system. The composition used as the examples is 10% (by weight) Type A gelatin and 20% (by weight) NaOH in a 70% (by weight) carrier, Plexar ®. The said composition was blended together in a Brabender mixing head at 400° F. for 20 minutes, and then pressed into approximately 2 mil thick films.

The film is capable of rapidly scavenging 170 cc oxygen per gram of gelatin when the film is saturated with moisture. One of the conditions adequate for saturating said composition with mosture is to retort the bare film at 250° F. for 2 hours.

The oxygen scavenging rate is extremely slow if the film of said composition is protected by a moisture barrier to reduce moisture penetration into the said composition. The following table illustrates the unretorted oxygen scavenging rate of the film of said composition protected by a 15 mil HDPE layer (moisture barrier layer) on both sides.

TABLE 3

| | cc $O_2$ Scavenged per gram of gelatin (73° F.) | | |
|---|---|---|---|
| | Storage Time | | |
| Storage RH | 37 Days | 58 Days | 108 Days |
| 44% | 0 | 6 | 8 |
| 75% | 0 | 10 | 41 |
| 100% | 9 | 24 | 61 |

It is apparent that the $O_2$ scavenging rate of the said composition can be controlled by the moisture protective layer and the storage conditions. Absorption will take place after the materials are exposed to moist air for prolonged periods of time. This shows that while retorting gives an immediate triggering, it is also possible to obtain triggering without retorting.

The gelatin containing system is effective as an oxygen scavenger but produces unpleasant odors when exposed to elevated temperatures for prolonged periods of time. Where containers are to be made by melt processing plastics (containing the oxygen scavenger systems), it is preferred to use a thermally stable system such as potassium sulfite as the oxygen scavenger.

The constructions described above have had the oxygen barrier layer near the center of the wall, flanked on either side by a structural (polyolefin) layer. There are alternative constructions which will perform satisfactorily and are within the framework of this approach. For example, a multilayer structure with thin layers of an oxygen barrier on the outside. The bulk of the sidewall would be a structural plastic in which an oxygen scavenger is embedded. The structural layer serves as the means to protect the oxygen scavenger lying in the interior of the structural layer from premature triggering, though a fractional amount of the oxygen scavenger near the surface of the structural layer may be triggered before product is packaged. Such a package could be made with a polyolefin wall containing a potassium sulfite dispersion and a Saran ® or epoxy coating on the outside of the can. Although outer oxygen barrier layers are preferred they can be omitted or replaced by pure polyolefin. In this case more scavenger would need to be embedded in the central layer. Finally, a chip instead of a pellet or package of powder, could be used by placing it within a sealed container. An advantage of integral constructions is to prevent the problem of packages of dry powder opening and contaminating the packed product. The chip could be of any of the recited constructions, the choice depending on the application.

While a preferred system has been shown and described it should be appreciated by those familiar with the arts involved that there are many other deliquescent compositions and polymeric materials which will when used in combination provide the requisite triggering ability to permit the successful application of this material to a package for the commercial processing of comestibles. It is, therefore, desired that the claims that follow are broadly construed to cover any combination that will operate in the manner taught by the foregoing disclosure.

What is claimed is:

1. A polymeric laminate having only solid layers which comprises:
   a. at least one polymeric protective layer in protective relation to an oxygen scavenger material in another layer of the laminate, and
   b. a polymeric layer having incorporated therein a dry oxygen scavenger material, the material being capable of a passive state for prolonged periods of time during which the oxygen scavenger will not directly react with oxygen, and triggerable to an active state when wetted with water which has selectively permeated the protective layer from outside the laminate, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

2. The laminate of claim 1 wherein a second polymeric protective layer is disposed on the side of said oxygen scavenger layer opposite to said first protective layer.

3. The laminate of claim 2 wherein a polymeric oxygen barrier layer is provided between said oxygen scavenger layer and said first protective layer.

4. The laminate of claim 2 wherein a second polymeric oxygen barrier layer is a protective layer.

5. The laminate of claim 3 wherein an outer polymeric protective layer is disposed on the free side of said oxygen scavenger layer and a second polymeric oxygen barrier layer is provided between said oxygen scavenger layer and said second polymeric protective layer.

6. A polymeric laminate having only solid layers comprised of:
   a polymeric oxygen barrier layer, and, adhered thereto, at least one polymeric protective layer in protective relation to a dry oxygen scavenger material incorporated in said polymeric protective layer,
   said oxygen scavenger material, being capable of a passive state for prolonged periods of time in which the oxygen scavenger will not directly react with oxygen, and triggerable to an active state when wetted with water which has selectively permeated the protective polymeric layer from outside thereof, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

7. The laminate of claim 6 wherein an outer polymeric layer is provided adjacent the oxygen barrier layer on the side opposite to said scavenger layer.

8. The laminate of claim 6 wherein a second polymeric oxygen barrier layer is disposed on the side of said oxygen scavenger layer, opposite to the first polymeric oxygen barrier layer.

9. A polymeric laminate having only solid layers which comprises:
   a. a polymeric oxygen barrier layer,
   b. at least one polymeric protective layer in protective relation to a scavenger material incorporated in another layer of the laminate,
   c. a polymeric layer between said oxygen barrier layer and said protective layer and having therein a dry oxygen scavenger composition, the composition being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

10. A polymeric laminate having only solid layers which comprises:

a. a polymeric oxygen barrier layer,
b. at least one polymeric protective layer in protective relation to an oxygen scavenger material in another layer of the laminate,
c. a polymeric layer between said oxygen barrier layer and said protective layer and having therein a dry oxygen scavenger material, the material being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
d. an outer polymeric protective layer adjacent the oxygen barrier layer on the side opposite to said scavenger layer wherein said protective layers are substantially resistant to permeation by water at ambient temperature and have enhanced transmission of water at elevated temperatures and therefore is selectively capable of permeation by water at an elevated temperature to thereby selectively permit the water to contact said oxygen scavenger material to convert it from the passive to the active state.

11. The laminate of claim 10 wherein a first adhesive layer is provided between said oxygen scavenger layer and said oxygen barrier layer, and a second adhesive layer is provided between said oxygen barrier layer and said polymeric layer.

12. The laminate of claim 10 wherein said scavenger layer is a polymeric adhesive containing said dry oxygen scavenger composition and a second adhesive layer is provided between said barrier layer and said outer polymeric layer.

13. A polymeric laminate having only solid layers which comprises:
a. a polymeric oxygen barrier layer,
b. first and second polymeric layers,
c. at least one first and second polymeric protective layers in protective relationship to said first and second polymeric layers, said first polymeric layer being located between said oxygen barrier layer and said first protective layer and said second polymeric layer being between said oxygen barrier layer and said second protective layer, said first and second polymeric layers having therein a dry oxygen scavenger material, the material being capable of a passive state for prolonged periods of time during which the oxygen scavenger will not directly react with oxygen, and adapted to be triggered to an active state when wetted with water which has selectively permeated a protective layer from outside of the laminate, whereupon the oxygen scavenger will directly react with oxygen, wherein said protective layers are substantially resistant to permeation by water at ambient temperature and have enhanced transmission of water at elevated temperatures and therefore are selectively capable of permeation by water at an elevated temperature to thereby selectively permit the water to contact said oxygen scavenger material to convert it from the passive to the active state.

14. The laminate of claims 1, 9, 10 or 13 wherein said protective layer has enhanced transmission of water at elevated temperatures amd becomes substantially resistant to permeation by water when cooled, so that the water which has permeated does not exit the laminate through said cooled protective layer, so that the scavenger material remains activated to absorb oxygen.

15. The laminate of claims 1, 6, 9, 10 or 13 wherein said oxygen scavenger material is an alkali and a gelatin and that said gelatin has been heat treated with or without said alkali.

16. The laminate of claim 15 wherein said heat treatment consists of raising the temperature of said gelatin to greater than 300° F. for more than 5 minutes.

17. The laminate of claim 15 wherein said heat treatment consists of raising the temperature of said oxygen scavenger material to greater than 300° F. for more than 5 minutes.

18. The laminate of claim 15 wherein said alkali is sodium hydroxide.

19. The laminate of claims 1, 6, 9, 10 or 13 wherein the oxygen scavenger material is adapted to be triggered by water at an elevated temperature during retorting.

20. The laminate of claims 1, 6, 9, 10 or 13 wherein the dry oxygen scavenger material is a singular material.

21. The laminate of claims 1, 6, 9, 10 or 13 wherein the oxygen scavenger material is incapable of self-generating water and is triggerable without the action of any other material in the laminate.

22. The laminate of claims 1, 6, 9, 10 or 13 wherein said oxygen scavenger material is a sulfite salt.

23. The laminate of claim 22 wherein said salt is potassium sulfite.

24. The laminate of claims 1, 6, 9, 10 or 13 wherein there is a plurality of said protective layers overlying said oxygen scavenger layer.

25. The laminate of claims 1, 9, 10 or 13 wherein said polymeric protective layer is olefinic.

26. The laminate of claim 25 wherein said olefinic material is a melt blend of polyethylene and polypropylene.

27. The laminate of claim 26 wherein said polyethylene and polypropylene are in substantially equal proportions.

28. The laminate of claims 6, 9, 10 or 13 wherein said oxygen barrier layer is an ethylene vinyl alcohol copolymer.

29. The laminate of claims 6, 9, 10 or 13 wherein said layers are laminated and the oxygen scavenger material is within a melt processible polymeric layer which is in contact with said oxygen barrier layer and said polymeric protective layer.

30. The laminate of claim 29 wherein said layers are co-extruded.

31. The laminate of claim 29 wherein said layers are co-injected.

32. The laminate of claim 29 wherein said layers are thermoformed.

33. The laminate of claim 29 wherein said melt processible polymeric layer is olefinic.

34. A multilayer polymeric container which includes a wall which is a laminate, the laminate having only solid layers which comprises:
a. at least one polymeric protective layer in protective relation to an oxygen scavenger layer, and
b. a polymeric layer having incorporated therein a dry oxygen scavenger material, the material being capable of a passive state for prolonged periods of time during which the oxygen scavenger will not directly react with oxygen, and triggerable to an active state when wetted with water which has selectively permeated the protective layer from outside the laminate, whereupon the oxygen scavenger will directly react with oxygen, wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

35. The container of claim 34 wherein a second polymeric protective layer is disposed on the side of said oxygen scavenger layer opposite to said first protective layer.

36. The container of claim 35 wherein a polymeric oxygen barrier layer is provided between said oxygen scavenger layer and said first protective layer.

37. The container of claim 35 wherein a second polymeric oxygen barrier layer is a protective layer.

38. The container of claim 36 wherein an outer polymeric protective layer is disposed on the free side of said oxygen scavenger layer and a second polymeric oxygen barrier layer is provided between said oxygen scavenger layer and said second polymeric protective layer.

39. A multilayer polymeric container which includes a wall which is a laminate, the laminate having only solid layers comprised of:
   a polymeric oxygen barrier layer, and, adhered thereto, at least one polymeric protective layer in protective relation to a dry oxygen scavenger material incorporated in said polymeric protective layer,
   said oxygen scavenger material, being capable of a passive state for prolonged periods of time in which the oxygen scavenger will not directly react with oxygen, and triggerable to an active state when wetted with water which has selectively permeated the protective polymeric layer from outside thereof, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

40. The container of claim 39 wherein an outer polymeric layer is provided adjacent the oxygen barrier layer on the side opposite to said scavenger layer.

41. The container of claim 39 wherein a second polymeric oxygen barrier layer is disposed on the side of said oxygen scavenger layer, opposite to the first polymeric oxygen barrier layer.

42. A multilayer polymeric container which includes a wall which is a laminate, the laminate having only solid layers which comprises:
   a. a polymeric oxygen barrier layer,
   b. at least one polymeric protective layer in protective relation to a scavenger material incorporated in another layer of the laminate,
   c. a polymeric layer between said oxygen barrier layer and said protective layer and having therein a dry oxygen scavenger composition, the composition being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

43. A multilayer polymeric container which includes a wall which is a laminate, the laminate having only solid layers which comprises:
   a. a polymeric oxygen barrier layer,
   b. at least one polymeric protective layer in protective relation to an oxygen scavenger material in another layer of the laminate,
   c. a polymeric layer between said oxygen barrier layer and said protective layer and having therein a dry oxygen scavenger composition, the composition being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   d. an outer polymeric protective layer adjacent the oxygen barrier layer on the side opposite to said scavenger layer
   wherein said protective layers are substantially resistant to permeation by water at ambient temperature and have enhanced transmission of water at elevated temperatures and therefore is selectively capable of permeation by water at an elevated temperature to thereby selectively permit the water to contact said oxygen scavenger composition to convert it from the passive to the active state.

44. The container of claim 43 wherein a first adhesive layer is provided between said oxygen scavenger layer and said oxygen barrier layer, and a second adhesive layer is provided between said oxygen barrier layer and said polymeric layer.

45. The container of claim 43 wherein said scavenger layer is a polymeric adhesive containing said dry oxygen scavenger composition and a second adhesive layer is provided between said barrier layer and said outer polymeric layer.

46. A multilayer polymeric container which comprises a wall which is a laminate, the laminate having only solid layers which comprises:
   a. a polymeric oxygen barrier layer,
   b. first and second polymeric layers,
   c. at least one first and second polymeric protective layers in protective relationship to said first and second polymeric layers, said first polymeric layer being located between said oxygen barrier layer and said first protective layer and said second polymeric layer being located between said oxygen barrier layer and said second protective layer, said first and second polymeric layers having therein a dry oxygen scavenger material, the material being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen, wherein said protective layers are substantially resistant to permeation by water at ambient temperature and have enhanced transmission of water at elevated temperatures and therefore are selectively capable of permeation by water at an elevated temperature to thereby selectively permit the water to contact said oxygen scavenger composition to convert it from the passive to the active state.

47. The container of claims 34, 42, 43 or 46 wherein said protective layer has enhanced transmission of water at elevated temperatures and becomes substantially resistant to permeation by water when cooled, so that the water which has permeated does not exit the laminate through said cooled protective layer, so that the scavenger material remains activated to absorb oxygen.

48. The container of claims 34, 39, 42, 43 or 46 wherein said oxygen scavenger material is an alkali and a gelatin and that said gelatin has been heat treated with or without said alkali.

49. The container of claim 48 wherein said heat treatment consists of raising the temperature of said gelatin to greater than 300° F. for more than 5 minutes.

50. The container of claim 48 wherein said heat treatment consists of raising the temperature of said oxygen scavenger material to greater than 300° F. for more than 5 minutes.

51. The container of claim 48 wherein said alkali is sodium hydroxide.

52. The container of claims 34, 48, 42, 43 or 46 wherein the oxygen scavenger material is adapted to be triggered by water at an elevated temperature during retorting.

53. The container of claims 34, 48, 42, 43 or 46 wherein the dry oxygen scavenger material is a singular material.

54. The container of claims 34, 39, 42, 43 or 46 wherein the oxygen scavenger material is incapable of self-generating water and is triggerable without the action of any other material in the laminate.

55. The container of claims 34, 39, 42, 43 or 46 wherein said oxygen scavenger material is a sulfite salt.

56. The container of claim 55 wherein said salt is potassium sulfite.

57. The container of claims 34, 39, 42, 43 or 46 wherein there is a plurality of said protective layers overlying said oxygen scavenger layer.

58. The container of claims 34, 42, 43 or 46 wherein said polymeric protective layer is olefinic.

59. The container of claim 58 wherein said olefinic material is a melt blend of polyethylene and polypropylene.

60. The container of claim 59 wherein said polyethylene and polypropylene are in substantially equal proportions.

61. The container of claims 39, 42, 43 or 46 wherein said oxygen barrier layer is an ethylene vinyl alcohol co-polymer.

62. The container of claims 39, 42, 43 or 46 wherein said layers are laminated and the oxygen scavenger material is within a melt processible polymeric layer which is in contact with said oxygen barrier layer and said polymeric protective layer.

63. The container of claim 62 wherein said layers are co-extruded.

64. The container of claim 62 wherein said layers are co-injected.

65. The container of claim 62 wherein said layers are thermoformed.

66. The container of claim 62 wherein said melt-processable polymeric layer is olefinic.

67. A method of producing a multilayer polymeric laminate which comprises forming a polymeric laminate, the laminate having only solid layers which comprises:
 a. at least one polymeric protective layer in protective relation to an oxygen scavenger material in another layer of the laminate, and
 b. a polymeric layer having incorporated therein a dry oxygen scavenger material, the material being capable of a passive state for prolonged periods of time during which the oxygen scavenger will not directly react with oxygen, and triggerable to an active state when wetted with water which has selectively permeated the protective layer from outside the laminate, whereupon the oxygen scavenger will directly react with oxygen, wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

68. The method of claim 67 wherein a second polymeric protective layer is disposed on the side of said oxygen scavenger layer opposite to said first protective layer.

69. The method of claim 68 wherein a polymeric oxygen barrier layer is provided between said oxygen scavenger layer and said first protective layer.

70. A method of producing a multilayer polymeric laminate which comprises forming a polymeric laminate, the laminate having only solid layers comprised of:
 a polymeric oxygen barrier layer, and, adhered thereto, at least one polymeric protective layer in protective relation to a dry oxygen scavenger material incorporated in said polymeric protective layer, said oxygen scavenger material, being capable of a passive state for prolonged periods of time in which the oxygen scavenger will not directly react with oxygen, and triggerable to an active state when wetted with water which has selectively permeated the protective polymeric layer from outside thereof, whereupon the oxygen scavenger will directly react with oxygen, wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

71. The method of claim 70 wherein an outer polymeric layer is provided adjacent the oxygen barrier layer on the side opposite to said scavenger layer.

72. A method of producing a multilayer polymeric laminate which comprises forming a multilayer polymeric laminate, the laminate having only solid layers which comprises:
   a. a polymeric oxygen barrier layer,
   b. at least one polymeric protective layer in protective relation to a scavenger material incorpoated in another layer of the laminate,
   c. a polymeric layer between said oxygen barrier layer and said protective layer and having therein a dry oxygen scavenger composition, the composition being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

73. A method of producing a multilayer polymeric laminate which comprises forming a solid polymeric laminate, the laminate having only solid layers which comprises:
   a. a polymeric oxygen barrier layer,
   b. at least one polymeric protective layer in protective relation to an oxygen scavenger material in another layer of the laminate,
   c. a polymeric layer between said oxygen barrier layer and said protective layer and having therein a dry oxygen scavenger material, the material being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   d. an outer polymeric protective layer adjacent the oxygen barrier layer on the side opposite to said scavenger layer wherein said protective layers are substantially resistant to permeation by water at ambient temperature and have enhanced transmission of water at elevated temperatures, and therefore is selectively capable of permeation by water at an elevated temperature to thereby selectively permit the water to contact said oxygen scavenger material to convert it from the passive to the active state.

74. The method of claim 73 wherein a first adhesive layer is provided between said oxygen scavenger layer and said oxygen barrier layer, and a second adhesive layer is provided between said oxygen barrier layer and said polymeric layer.

75. The method of claim 73 wherein said scavenger layer is a polymeric adhesive containing said dry oxygen scavenger composition and a second adhesive layer is provided between said barrier layer and said outer polymeric layer.

76. A method of producing a multilayer polymeric laminate which comprises forming a polymeric laminate, the laminate having only solid layers which comprises:
   a. a polymeric oxygen barrier layer,
   b. first and second polymeric layers,
   c. at least one first and second polymeric protective layers in protective relationship to said first and second polymeric layers, said first polymeric layer being located between said oxygen barrier layer and said first protective layer, and said second polymeric layer being located between said oxygen barrier layer and said second polymeric protective layer, said first and second polymeric layers having therein a dry oxygen scavenger material, the material being capable of a passive state for prolonged periods of time during which the oxygen scavenger will not directly react with oxygen, and adapted to be triggered to an active state when wetted with water which has selectively permeated the protective layer from outside of the laminate, whereupon the oxygen scavenger will directly react with oxygen,
   wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state.

77. The method of claims 67, 72, 73 or 76 wherein said protective layer has enhanced transmission of water at elevated temperatures and becomes substantially resistant to permeation by water when cooled so that the water which has permeated does not exit the laminate through said cooled protective layer, so that the scavenger material remains activated to absorb oxygen.

78. The method of claims 67, 70, 72, 73 or 76 wherein said oxygen scavenger material is an alkali and a gelatin and that said gelatin has been heat treated with or without said alkali.

79. The method of claim 78 wherein said heat treatment consists of raising the temperature of said gelatin to greater than 300° F. for more than 5 minutes.

80. The method of claim 78 wherein said heat treatment consists of raising the temperature of said oxygen scavenger material to greater than 300° F. for more than 5 minutes.

81. The method of claim 78 wherein said alkali is sodium hydroxide.

82. The method of claims 67, 70, 72, 73 or 76 wherein the oxygen scavenger material is adapted to be triggered by water at an elevated temperature during retorting.

83. The method of claims 67, 70, 72, 73 or 76 wherein the dry oxygen scavenger material is a singular material.

84. The laminate of claims 67, 70, 72, 73 or 76 wherein the oxygen scavenger material is incapable of self-generating water and is triggerable without the action of any other material in the laminate.

85. The method of claims 67, 70, 72, 73 or 76 wherein said oxygen scavenger material is a sulfite salt.

86. The method of claim 85 wherein said salt is potassium sulfite.

87. The method of claims 67, 70, 72, 73 or 76 wherein there is a plurality of said protective layers overlying said oxygen scavenger layer.

88. The method of claims 67, 72, 73 or 76 wherein said polymeric protective layer is olefinic.

89. The method of claim 88 wherein said olefinic material is a melt blend of polyethylene and polypropylene.

90. The method of claim 89 wherein said polyethylene and polypropylene are in substantially equal proportions.

91. The method of claims 70, 72, 73 or 76 wherein said oxygen barrier layer is an ethylene vinyl alcohol co-polymer.

92. The method of claims 70, 72, 73 or 76 wherein said layers are laminated and the oxygen scavenger material is within a melt processible polymeric layer which is in contact with said oxygen barrier layer and said polymeric protective layer.

93. The method of claim 92 wherein said layers are co-extruded.

94. The method of claim 92 wherein said layers are co-injected.

95. The method of claim 92 wherein said layers are thermoformed.

96. The method of claim 92 wherein said melt processible polymeric layer is olefinic.

97. A method of producing a triggered solid polymeric multilayer food container having only solid layers which comprises:
  a. mixing a polymeric material with a dry oxygen scavenger composition to form a thermoplastic mixture, said oxygen scavenger composition being capable of a passive state for prolonged periods of time during which the oxygen scavenger will not directly react with oxygen, and adapted to be triggered to an active state when wetted with water which has selectively permeated a protective layer from outside of the laminate whereupon it will directly react with oxygen,
  b. forming a multilayer polymeric laminate containing:
    i. at least one polymeric protective layer in protective relation to an oxygen scavenger material in another layer of the laminate, and
    ii. a polymeric layer of said thermoplastic mixture having incorporated therein said dry oxygen scavenger material, wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state,
  c. forming the laminate into a container and maintaining the container in its dry state,
  d. filling the container with a comestible containing water and
  e. retorting the container thereby to activate the oxygen scavenger material into its active state.

98. The method of claims 97, wherein a second polymeric protective layer is disposed on the side of said oxygen scavenger layer opposite to said first protective layer.

99. The method of claim 98 wherein a polymeric oxygen barrier layer is provided between said oxygen scavenger layer and said first protective layer.

100. A method of producing a triggered polymeric multilayer food container having only solid layers which comprises:
  a. mixing a polymeric material with a dry oxygen scavenger composition to form a thermoplastic mixture, said oxygen scavenger composition being capable of a passive state for prolonged periods of time during which the oxygen scavenger will not directly react with oxygen, and adapted to be triggered to an active state when wetted with water which has selectively permeated a protective layer from outside of the laminate whereupon it will directly react with oxygen,
  b. forming a multilayer polymeric laminate containing:
    a polymeric oxygen barrier layer, and, adhered thereto, at least one polymeric protective layer in protective relation to said dry oxygen scavenger composition incorporated in said polymeric protective layer,
  wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state,
  c. forming the laminate into a container and maintaining the container in its dry state,
  d. filling the container with a comestible containing water, and
  e. retorting the container therby to activate the oxygen scavenger material into its active state.

101. The method of claim 100 wherein an outer polymeric layer is provided adjacent the oxygen barrier layer on the side opposite to said scavenger layer.

102. A method of producing a triggered polymeric multilayer food container having only solid layers which comprises:
  a. mixing a polymeric material with a dry oxygen scavenger composition to form a thermoplastic mixture, said oxygen scavenger composition being capable of a passive state for prolonged periods of time during which the oxygen scavenger will not directly react with oxygen, and adapted to be triggered to an active state when wetted with water which has selectively permeated a protective layer from outside of the laminate whereupon it will directly react with oxygen,
  b. forming a multilayer polymeric laminate containing:
    i. a polymeric oxygen barrier layer,
    ii. at least one polymeric protective layer in protective relation to an oxygen scavenger material incorporated in another layer of the laminate,
    iii. a polymeric layer of said thermoplastic mixture between said oxygen barrier layer and said protective layer and having therein said dry oxygen scavenger material,
  wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state, c. forming the laminate into a container and maintaining the container in its dry state, d. filling the container with a comestible containing water and e. retorting the container thereby to activate the oxygen scavenger material into its active state.

103. A method of producing a triggered polymeric multilayer food container having only solid layers which comprises:

a. mixing a polymeric material with a dry oxygen scavenger composition to form a thermoplastic mixture, said oxygen scavenger composition being capable of a passive state for prolonged periods of time during which the oxygen scavenger will not directly react with oxygen, and adapted to be triggered to an active state when wetted with water which has selectively permeated a protective layer from outside of the laminate whereupon it will directly react with oxygen, b. forming a multilayer polymeric laminate containing:
  i. a polymeric oxygen barrier layer,
  ii. at least one polymeric protective layer in protective relation to an oxygen scavenger material in another layer of the laminate,
  iii. a polymeric layer of said thermoplastic mixture between said oxygen barrier layer and said protective layer and having therein said dry oxygen scavenger material,
  iv. an outer polymeric protective layer adjacent the oxygen barrier layer on the side opposite to said scavenger layer wherein said protective layers are substantially resistant to permeation by water at ambient temperature and have enhanced transmission of water at elevated temperatures and therefore is selectively capable of permeation by water at an elevated temperature to thereby selectively permit the water to contact said oxygen scavenger material to convert it from the passive to the active state, c. forming the laminate into a container and maintaining the container in its dry state, d. filling the container with a comestible containing water and e. retorting the container thereby to activate the oxygen scavenger material into its active state.

104. The method of claim 103 wherein a first adhesive layer is provided between said oxygen scavenger layer and said oxygen barrier layer, and a second adhesive layer is provided between said oxygen barrier layer and said polymeric layer.

105. The method of claim 103 wherein said scavenger layer is a polymeric adhesive containing said dry oxygen scavenger composition and a second adhesive layer is provided between said barrier layer and said outer polymeric layer.

106. A method of producing a triggered polymeric multilayer food container having only solid layers which comprises:

a. mixing a polymeric material with a dry oxygen scavenger composition to form a thermoplastic mixture, said oxygen scavenger composition being capable of a passive state for prolonged periods of time during which the oxygen scavenger will not directly react with oxygen, and adapted to be triggered to an active state when wetted with water which has selectively permeated a protective layer from outside of the laminate whereupon it will directly react with oxygen, b. forming a multilayer polymeric laminate containing:
  i. a polymeric oxygen barrier layer,
  ii. first and second polymeric layers,
  iii. at least one first and second polymeric protective layers in protective relationship to said first and second polymeric layers, a first polymeric layer of said thermoplastic mixture being located between said oxygen barrier layer and said first protective layer, and a second polymeric layer of said thermoplastic mixture being located between said oxygen barrier layer said second polymeric protective layer, said first and second polymeric layers having therein said dry oxygen scavenger material, wherein said protective layer is substantially resistant to permeation by water at ambient temperature and has enhanced transmission of water at elevated temperatures and therefore is selectively capable of permeation by water at an elevated temperature to thereby selectively permit the water to contact said oxygen scavenger material to convert it from the passive to the active state, c. forming the laminate into a container and maintaining the container in its dry state, d. filling the container with a comestible containing water and e. retorting the container thereby to activate the oxygen scavenger material into its active state.

107. The method of claims 97, 102, 103 or 106 wherein said protective layer has enhanced transmission of water at elevated temperatures and becomes substantially resistant to permeation by water when cooled, so that the water which has permeated does not exit the laminate through said cooled protective layer, so that the scavenger material remains activated to absorb oxygen.

108. The method of claims 97, 100, 102, 103 or 106 wherein said oxygen scavenger material is an alkali and a gelatin and that said gelatin has been heat treated with or without said alkali.

109. The method of claim 108 wherein said heat treatment consists of raising the temperature of said gelatin to greater than 300° F. for more than 5 minutes.

110. The method of claim 108 wherein said heat treatment consists of raising the temperature of said oxygen scavenger material to greater than 300° F. for more than 5 minutes.

111. The method of claim 108 wherein said alkali is sodium hydroxide.

112. The method of claims 97, 100, 102, 103 or 106 wherein the oxygen scavenger material is adapted to be triggered by water at an elevated temperature during retorting.

113. The method of claims 97, 100, 102, 103 or 106 wherein the dry oxygen scavenger material is a singular material.

114. The method of claims 97, 100, 102, 103 or 106 wherein the oxygen scavenger material is incapable of self-generating water and is triggerable without the action of any other material in the laminate.

115. The method of claims 97, 100, 102, 103 or 106 wherein said oxygen scavenger material is a sulfite salt.

116. The method of claim 115, wherein said salt is potassium sulfite.

117. The method of claims 97, 100, 102, 103 or 106 wherein there is a plurality of said protective layers overlying said oxygen scavenger layer.

118. The method of claims 97, 102, 103 or 106 wherein said polymeric protective layer is olefinic.

119. The method of claim 118 wherein said olefinic material is a melt blend of polyethylene and polypropylene.

120. The method of claim 119 wherein said polyethylene and polypropylene are in substantially equal proportions.

121. The method of claims 100, 102, 103 or 106 wherein said oxygen barrier layer is an ethylene vinyl alcohol co-polymer.

122. The method of claims 100, 102, 103 or 106 wherein said layers are formed by laminating and the oxygen scavenger material is within a melt processible polymeric layer which is in contact with said oxygen barrier layer and said polymeric protective layer.

123. The method of claim 122 wherein said layers are co-extruded.

124. The method of claim 122 wherein said layers are co-injected.

125. The method of claim 122 wherein said layers are thermoformed.

* * * * *

UNITED STATES PATENT AND TRADEMARK OFFICE
CERTIFICATE OF CORRECTION

PATENT NO. : 4,536,409
DATED : August 20, 1985
INVENTOR(S) : Christopher J. Farrell; Boh C. Tsai It is certified that error appears in the above—identified patent and that said Letters Patent is hereby corrected as shown below:

Column 15, line 38 - delete "48", insert --39--

Column 15, line 42 - delete "48", insert --39--

Signed and Sealed this

Twenty-eighth Day of April, 1987

Attest:

DONALD J. QUIGG

Attesting Officer

Commissioner of Patents and Trademarks